US010936961B1

(12) United States Patent
Jain et al.

(10) Patent No.: US 10,936,961 B1
(45) Date of Patent: Mar. 2, 2021

(54) AUTOMATED PREDICTIVE PRODUCT RECOMMENDATIONS USING REINFORCEMENT LEARNING

(71) Applicant: FMR LLC, Boston, MA (US)

(72) Inventors: Akshay Jain, New Delhi (IN); Debalina Gupta, Bengaluru (IN); Shishir Shekhar, Bangalore (IN); Bernard Kleynhans, Cambridge, MA (US); Serdar Kadioglu, Somerville, MA (US); Alex Arias-Vargas, Foxboro, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/988,507

(22) Filed: Aug. 7, 2020

(51) Int. Cl.
*G06N 5/04* (2006.01)
*G06Q 30/06* (2012.01)
*G06N 20/00* (2019.01)

(52) U.S. Cl.
CPC .............. *G06N 5/04* (2013.01); *G06N 20/00* (2019.01); *G06Q 30/0631* (2013.01)

(58) Field of Classification Search
USPC ........................................................ 706/12
See application file for complete search history.

(56) References Cited

U.S. PATENT DOCUMENTS

| 8,775,230 | B2 | 7/2014 | Casas et al. | |
|---|---|---|---|---|
| 9,420,100 | B2 | 8/2016 | Bellini et al. | |
| 9,588,819 | B2 * | 3/2017 | Kadioglu | G06F 16/288 |
| 9,665,465 | B1 * | 5/2017 | Jain | G06F 21/577 |
| 9,800,727 | B1 * | 10/2017 | Chakrabarty | H04M 3/5191 |
| 9,836,765 | B2 | 12/2017 | Hariri et al. | |
| 10,007,538 | B2 * | 6/2018 | Kadioglu | G06F 9/5027 |

(Continued)

FOREIGN PATENT DOCUMENTS

CN       107563867 A     1/2018

OTHER PUBLICATIONS

Nguyen, Trong T. & Lauw, Hady W., "Dynamic Clustering of Contextual Multi-Armed Bandits," CIKM'14: Proceedings of the 2014 ACM International Conference on Information and Knowledge Management: Nov. 3-7, 2014, Shanghai, China. 1959-1962 (2014).

*Primary Examiner* — Michael B Holmes
(74) *Attorney, Agent, or Firm* — Proskauer Rose LLP

(57) ABSTRACT

Methods and apparatuses are described for automated predictive product recommendations using reinforcement learning. A server captures historical activity data associated with a plurality of users. The server generates a context vector for each user, the context vector comprising a multidimensional array corresponding to historical activity data. The server transforms each context vector into a context embedding. The server assigns each context embedding to an embedding cluster. The server determines, for each context embedding, (i) an overall likelihood of successful attempt and (ii) an incremental likelihood of success associated products available for recommendation. The server calculates, for each context embedding, an incremental income value associated with each of the likelihoods of success. The server aggregates (i) the overall likelihood of successful attempt, (ii) the likelihoods of success, and (iii) the incremental income values into a recommendation matrix. The server generates instructions to recommend products based upon the recommendation matrix.

26 Claims, 11 Drawing Sheets

(56) References Cited

U.S. PATENT DOCUMENTS

| | | | | |
|---|---|---|---|---|
| 10,146,665 B2 * | 12/2018 | Kadioglu | .................. | G06F 9/50 |
| 10,248,550 B2 * | 4/2019 | Kadioglu | ............ | G06F 11/3672 |
| 10,356,244 B1 * | 7/2019 | Sengupta | ............... | G06N 7/005 |
| 10,404,635 B2 * | 9/2019 | Huang | ................ | H04L 67/1095 |
| 10,417,643 B2 | 9/2019 | Sri et al. | | |
| 2009/0043597 A1 | 2/2009 | Agarwal et al. | | |
| 2012/0263291 A1 | 10/2012 | Zernik et al. | | |
| 2018/0082213 A1 | 3/2018 | McCord | | |
| 2018/0129971 A1 | 5/2018 | Vlassis et al. | | |

* cited by examiner

| Population | | Context | Row Type | | Products | | | | Revenue |
|---|---|---|---|---|---|---|---|---|---|
| id | event_date | context_vector | is_attempt | is_success | Prod_1 | Prod_2 | ... | Prod_3 | OI |
| 451820 | 6/14/2018 | [2,7,0,3,7,4,...] | 1 | 1 | 1 | 1 | 0 | 0 | 222.3770479 |
| 794491 | 2/6/2018 | [2,7,0,3,7,4,...] | 0 | 0 | 0 | 0 | 0 | 0 | 0 |
| 497290 | 3/14/2018 | [2,7,0,3,7,4,...] | 0 | 0 | 0 | 0 | 0 | 0 | 0 |
| 232354 | 11/1/2017 | [2,7,0,3,7,4,...] | 1 | 0 | 0 | 0 | 0 | 0 | -7.23 |
| 889788 | 11/17/2017 | [2,7,0,3,7,4,...] | 0 | 0 | 0 | 0 | 0 | 0 | 0 |
| 158943 | 3/1/2018 | [2,7,0,3,7,4,...] | 1 | 1 | 0 | 0 | 0 | 1 | -35.3816164 |
| 141213 | 3/7/2018 | [2,7,0,3,7,4,...] | 1 | 1 | 0 | 1 | 1 | 0 | 186.1129195 |
| 605577 | 2/16/2018 | [2,7,0,3,7,4,...] | 1 | 1 | 1 | 1 | 0 | 1 | 5105.83698 |
| 655689 | 3/12/2018 | [2,7,0,3,7,4,...] | 1 | 1 | 0 | 0 | 0 | 0 | 4.9542492 |
| 755426 | 2/7/2018 | [2,7,0,3,7,4,...] | 1 | 0 | 0 | 0 | 0 | 0 | 0 |
| 566174 | 8/3/2017 | [2,7,0,3,7,4,...] | 1 | 0 | 0 | 0 | 0 | 0 | -29.1589718 |
| 850754 | 8/7/2017 | [2,7,0,3,7,4,...] | 0 | 0 | 0 | 0 | 0 | 0 | 0.0110532 |
| 533494 | 11/1/2017 | [2,7,0,3,7,4,...] | 0 | 0 | 0 | 0 | 0 | 0 | 0 |
| 596782 | 11/3/2017 | [2,7,0,3,7,4,...] | 0 | 0 | 0 | 0 | 0 | 0 | 0 |
| 872804 | 7/14/2017 | [2,7,0,3,7,4,...] | 0 | 0 | 0 | 0 | 0 | 0 | -1.8523208 |

AUTOMATED PREDICTIVE PRODUCT RECOMMENDATIONS USING REINFORCEMENT LEARNING

TECHNICAL FIELD

This application relates generally to methods and apparatuses, including computer program products, for automated predictive product recommendations using reinforcement learning.

BACKGROUND

Large consumer-facing companies constantly face a challenge of retaining their existing customers and expanding to reach new customers, especially considering the fragmentation and diversity of customer bases. Companies want to recommend products and services to each customer that take the customer's preferences, demographics, and needs into account. For example, diversity of a customer base can arise from different demographics like age, location, life events (marriage, retirement, etc.), personal situations and needs, time of the year, macro-economic factors, demand for the new products in the market, and the like. For customer-focused organizations, it is imperative to identify and address the specific personalized needs of each of the customers which, if not done, might lead to attrition of the customer base (and thus a decrease in revenue).

A challenge in solving the above problem arises in the cost incurred by companies in developing and executing product recommendation strategies. For example, the high cost of phone representatives makes it necessary for companies to utilize their existing contact bandwidth in the most efficient way as possible. Typically, a company's focus is to reach out to only those customers who have a high likelihood to be positively persuaded to, e.g., purchase a product and consequently contribute to the incremental revenue of the sales channel—instead of customers that have a low likelihood of purchasing a product and thus would not contribute to the incremental revenue.

Current recommender systems have been developed using artificial intelligence techniques in an attempt to solve the above problems. For example, these systems can utilize classification modeling that tries to predict an outcome (e.g., whether or not a sales transaction would result from a given customer's attributes) based upon historical data. However, these systems typically just focus on making single winner recommendations that are incapable of utilizing the cost of channel in an efficient way. A ranked/ordered list of recommendations becomes a necessity in such cases. In addition, with the rate of data growth and the ever-changing customer preferences, the above-mentioned recommendation modeling systems require constant, manual scaling and re-tuning, as such models tend to decay with time. This means a significant investment of time and oversight to ensure that the models perform with accuracy in view of the most recent product recommendation and sales conversion data.

SUMMARY

Therefore, what is needed are methods and systems for automated predictive product recommendations and lead generation using advanced AI techniques that do not rely on a recommendation model that requires re-tuning over time. The techniques described herein advantageously combine targeted direct marketing and recommendation (using treatment and control populations), personalization and self-learning through reinforcement learning based on a User Collaborative Contextual Thompson Sampling Algorithm. Unlike most de facto personalized product recommendation solutions, the systems and methods comprise a self-learning framework for targeted personalized recommendation which utilizes reinforcement learning and is a model-free approach to decide on the optimal product recommendation strategy—thereby needing no manual effort or re-tuning. In addition, the systems and methods beneficially eliminate a quotidian issue of the unbalanced nature of treatment and control populations by grouping customers with similar attributes, which has a high impact on the accuracy. Further, these systems and methods estimate product-level incremental response in view of a particular marketing touchpoint or channel, instead of a simple response. Consequently, the outcome generated by the systems and methods optimizes not only the revenue but also the marketing cost involved.

As can be appreciated, traditional Thompson sampling algorithms are designed to give a single winner outcome as a recommendation. However, the implementation described herein modifies this traditional outcome of Thompson sampling to provide probabilities, which can be used to get a prioritized list of recommendations for each customer. Also, the methods and systems described herein can discover customers' hidden preferences by considering their contexts and randomly recommending products in an informed way, thus discovering preferences by monitoring the customers' responses.

The invention, in one aspect, features a computerized method of automated predictive product recommendations using reinforcement learning. A server computing device captures historical user activity data associated with a plurality of users, the historical user activity data comprising transaction data, demographic data, and recommendation response data. The server computing device generates a context vector for each user of the plurality of users, the first context vector comprising a multidimensional array corresponding to at least a portion of the historical user activity data for the user. The server computing device transforms each context vector for the plurality of users into a context embedding, the context embedding comprising a multidimensional array that has a fewer number of dimensions than the context vector. The server computing device assigns each context embedding for the plurality of users to an embedding cluster. The server computing device determines, for each context embedding, (i) an overall likelihood of successful attempt to the user associated with the context embedding and (ii) an incremental likelihood of success associated with each of one or more products available for recommendation to the user associated with the context embedding. The server computing device calculates, for each context embedding, an incremental income value associated with each of the incremental likelihoods of success associated with the products available for recommendation to the user associated with the context embedding. The server computing device aggregates (i) the overall likelihood of successful attempt to the user associated with the context embedding, (ii) the incremental likelihoods of success associated with each of the products available for recommendation to the user associated with the context embedding, and (iii) the incremental income values corresponding to the incremental likelihoods of success associated with each of the products available for recommendation to the user associated with the context embedding, into a recommendation matrix for the plurality of users. The server computing device generates instructions for a remote computing device to recommend products to one or more users based upon the recommendation matrix.

The invention, in another aspect, features a system for automated predictive product recommendations using reinforcement learning. The system comprises a server computing device having a memory for storing computer-executable instructions and a processor that executes the computer-executable instructions to capture historical user activity data associated with a plurality of users, the historical user activity data comprising transaction data, demographic data, and recommendation response data. The server computing device generates a context vector for each user of the plurality of users, the first context vector comprising a multidimensional array corresponding to at least a portion of the historical user activity data for the user. The server computing device transforms each context vector for the plurality of users into a context embedding, the context embedding comprising a multidimensional array that has a fewer number of dimensions than the context vector. The server computing device assigns each context embedding for the plurality of users to an embedding cluster. The server computing device determines, for each context embedding, (i) an overall likelihood of successful attempt to the user associated with the context embedding and (ii) an incremental likelihood of success associated with each of one or more products available for recommendation to the user associated with the context embedding. The server computing device calculates, for each context embedding, an incremental income value associated with each of the incremental likelihoods of success associated with the products available for recommendation to the user associated with the context embedding. The server computing device aggregates (i) the overall likelihood of successful attempt to the user associated with the context embedding, (ii) the incremental likelihoods of success associated with each of the products available for recommendation to the user associated with the context embedding, and (iii) the incremental income values corresponding to the incremental likelihoods of success associated with each of the products available for recommendation to the user associated with the context embedding, into a recommendation matrix for the plurality of users. The server computing device generates instructions for a remote computing device to recommend products to one or more users based upon the recommendation matrix.

Any of the above aspects can include one or more of the following features. In some embodiments, determining the incremental likelihood of success associated with each of one or more products available for recommendation to the user associated with the context embedding comprises: identifying one or more other context embeddings in the embedding cluster assigned to the user's context embedding that have a successful product recommendation; determining a first likelihood of success associated with each of the products available for recommendation based upon the identified context embeddings that have a successful product recommendation; identifying one or more other context embeddings in the embedding cluster assigned to the user's context embedding that have not been recommended a product; determining a second likelihood of success associated with each of the products available for recommendation based upon the identified context embeddings that have not been recommended a product; generating an incremental likelihood of success associated with each of the one or more products available for recommendation to the user associated with the context embedding by comparing, for each product, (i) the first likelihood of success to (ii) the second likelihood of success.

In some embodiments, determining a first likelihood of success associated with each of the products available for recommendation based upon the identified context embeddings that have a successful product recommendation comprises: generating, by the server computing device, a success rate for each of the products based upon the identified context embeddings that have a successful product recommendation; and applying, by the server computing device, a Thompson Sampling algorithm to the success rate for each of the products to generate the first likelihood of success associated with each of the products available for recommendation based upon the identified context embeddings that have a successful product recommendation. In some embodiments, determining a second likelihood of success associated with each of the products available for recommendation based upon the identified context embeddings that have not been recommended a product comprises: generating, by the server computing device, a success rate for each of the products based upon the identified context embeddings that have not been recommended a product; and applying, by the server computing device, a Thompson Sampling algorithm to the success rate for each of the products to generate the second likelihood of success associated with each of the products available for recommendation based upon the identified context embeddings that have not been recommended a product.

In some embodiments, transforming each context vector for the plurality of users into a context embedding comprises: executing, by the server computing device, an auto-encoder against the context vector to determine an optimal number of dimensions for the context embedding; and transforming, by the server computing device, the context vector into the context embedding using an output of the auto-encoder. In some embodiments, assigning each context embedding for the plurality of users to an embedding cluster comprises: generating, by the server computing device, a plurality of embedding clusters by applying an observation clustering algorithm to the context embeddings for the plurality of users, each embedding cluster comprising a centroid vector generated by the observation clustering algorithm; and assigning, by the server computing device, each context embedding to an embedding cluster whose centroid vector has a minimum distance to the context embedding. In some embodiments, the minimum distance is a Euclidian minimum distance. In some embodiments, the observation clustering algorithm is a K-means clustering algorithm.

In some embodiments, determining the overall likelihood of successful attempt to the user associated with the context embedding comprises: identifying, by the computing device, one or more other context embeddings in the embedding cluster assigned to the user's context embedding that have been recommended a product; generating, by the server computing device, a success rate and a failure rate associated with the identified context embeddings; and applying, by the server computing device, a Thompson Sampling algorithm to the success rate and the failure rate to generate the overall likelihood of successful attempt to the user associated with the context embedding. In some embodiments, the server computing device sorts the recommendation matrix across the plurality of users by one or more of the incremental income values associated with one or more of the products available for recommendation or the overall likelihood of successful attempt.

In some embodiments, generating instructions for a remote computing device to recommend products to one or more users based upon the recommendation matrix comprises: generating, by the server computing device, a ranking of one or more users based upon the recommendation matrix; determining, by the server computing device, a contact channel for each user in the ranking of users; and transmitting, by the server computing device, the ranking of users, the recommendation matrix, and the contact channel for each user to a remote computing device, wherein the remote computing device provides a product recommendation to a computing device of each user via the contact channel, the product recommendation based upon the recommendation matrix. In some embodiments, the contact channel comprises an email address, an IP address, a phone number, a messaging address, or a social media identifier. In some embodiments, the remote computing device determines a product recommendation to provide to the user by selecting an optimal incremental income value for the user from the recommendation matrix and identifying a product based upon the optimal incremental income value.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 9 is a diagram of exemplary historical user activity data.

FIG. 10 is a diagram showing the outcome of the feature selection process to generate a final feature set.

DETAILED DESCRIPTION

Figure 1:
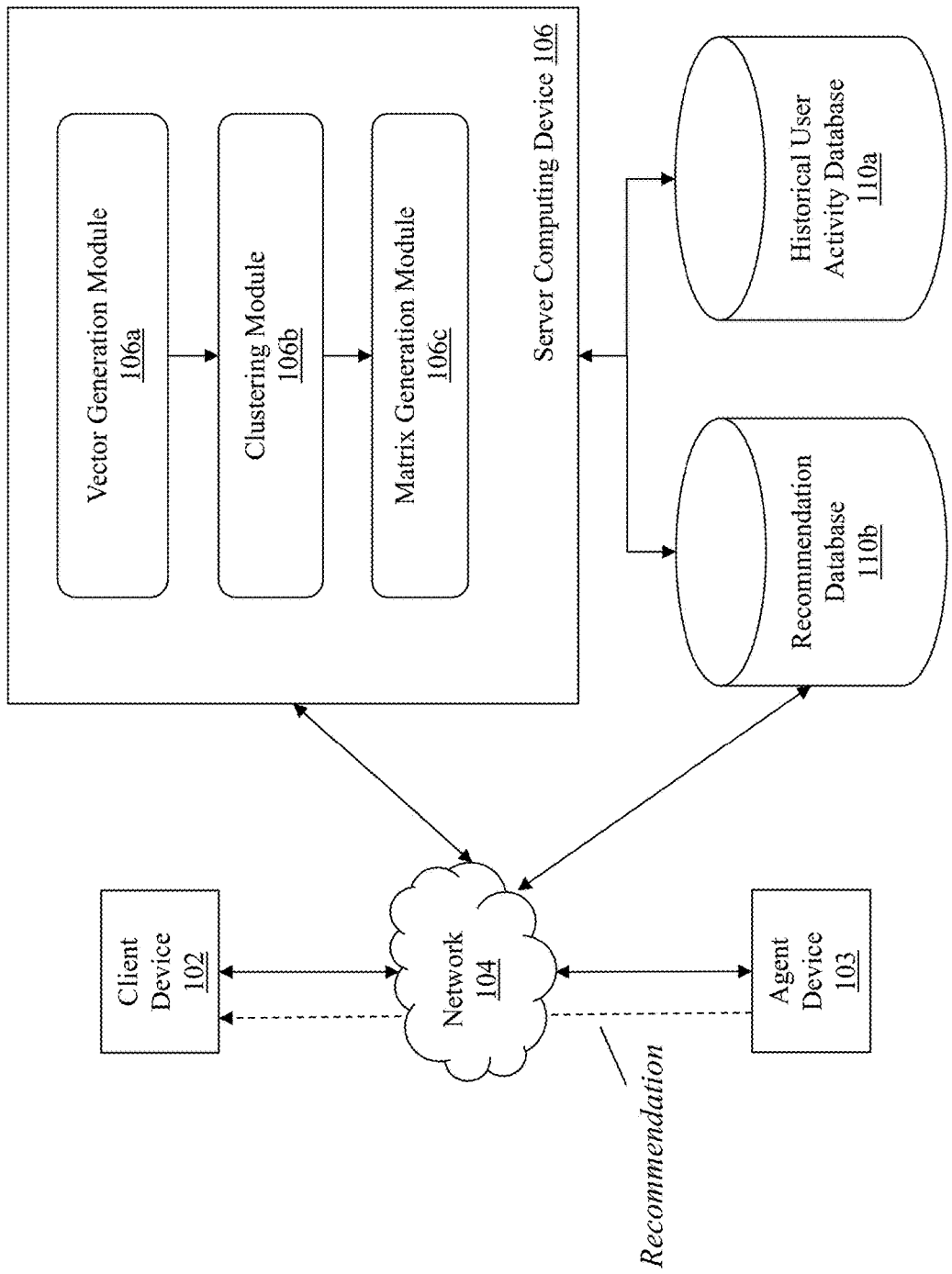
FIG. 1 is a block diagram of a system for automated predictive product recommendations using reinforcement learning.

FIG. 1 is a block diagram of a system 100 for automated predictive product recommendations using reinforcement learning. The system 100 includes a client computing device 102, an agent computing device 103, a communications network 104, a server computing device 106 that includes a vector generation module 106a, a clustering module 106b, and a matrix generation module 106c, a historical user activity database 110a, and a recommendation database 110b.

The client computing device 102 connects to the communications network 104 in order to communicate with the agent computing device 103 and/or the server computing device 106 to provide input and receive output relating to the process for automated predictive product recommendations using reinforcement learning as described herein. The client computing device 102 is coupled to a display device (not shown). For example, client computing device 102 can provide a graphical user interface (GUI) via the display device that presents output resulting from the methods and systems described herein. In some embodiments, the client computing device 102 is operated by an end user (e.g., a customer using the device 102 to receive product recommendations from the agent computing device 103 and/or the server computing device 106 (which can be operated by a business or other entity with which the customer has a relationship).

Exemplary client computing devices 102 include but are not limited to desktop computers, laptop computers, tablets, mobile devices, smartphones, smart watches, Internet-of-Things (IoT) devices, and internet appliances. It should be appreciated that other types of computing devices that are capable of connecting to the components of the system 100 can be used without departing from the scope of invention. Although FIG. 1 depicts a single client computing device 102, it should be appreciated that the system 100 can include any number of client computing devices.

The agent computing device 103 (also referred to herein as a remote device) is a computing device coupled to the server computing device 106 and is operated by a customer service representative and/or sales agent. In one example, the agent computing device 103 is a workstation (e.g., desktop computer, telephony device) in a call center that enables the agent to access customer information, receive recommendation information from the server computing device 106, and perform actions using software on the agent computing device 103 to provide product recommendations to a user at the client device 102. The agent computing device 103 is capable of executing locally-stored software applications and also capable of accessing software applications delivered from the server computing device 106 (or other computing devices) via a cloud-based or software-as-a-service paradigm. The software applications can provide a wide spectrum of functionality (e.g., CRM, account, sales, inventory, ordering, information access, and the like) to the agent. As can be appreciated, other types of agent computing devices 103 that can establish a communication session with the server computing device 106 and/or the client device 102 are within the scope of the invention. In some embodiments, the remote device 103 is connected directly to the server computing device 106 (e.g., via local cable) and in some embodiments, the remote device 103 is connected to the server computing device 106 via the communications network 104 and/or one or more local networks.

As mentioned above, the agent computing device 103 can provide product recommendations to the client device 102 via a communications session. It should be appreciated that the agent computing device 103 can provide the product recommendations via any number of different channels—for example, the agent computing device 103 can provide the recommendations via email, text, automated voice mail, automated chat, live phone call with the agent, link to a website describing the product, and so forth. As described herein, historical recommendation and response data can be optionally analyzed by the server computing device 106 for each of these channels to determine, e.g., an incremental income value associated with each channel (and/or each product in each channel), a success rate for each channel, and the like, so that the recommendation matrix described herein can be fine-tuned for an optimal recommendation result (i.e., selecting a channel to use for communicating product recommendations to a particular customer, where historical data for similar customers (or the same customer) using that channel exhibits a higher likelihood of success and/or incremental income value than other channels).

The communications network 104 enables the client computing device 102, the agent computing device 103, the server computing device 106, and the databases 108a-108b to communicate with each other. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for automated predictive product recommendations using reinforcement learning as described herein. The server computing device 106 includes several computing modules 106a-106c that execute on the processor of the server computing device 106. In some embodiments, the modules 106a-106c are specialized sets of computer software instructions programmed onto one or more dedicated processors in the server computing device 106 and can include specifically-designated memory locations and/or registers for executing the specialized computer software instructions.

Although the modules 106a-106c are shown in FIG. 1 as executing within the same server computing device 106, in some embodiments the functionality of the modules 106a-106c can be distributed among a plurality of server computing devices. As shown in FIG. 1, the server computing device 106 enables the modules 106a-106c to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106a-106c is described in detail below.

The databases 108a-108b are located on a single computing device (or in some embodiments, on a set of computing devices) coupled to the server computing device 106 and is configured to receive, generate, and store specific segments of data relating to the process of automated predictive product recommendations using reinforcement learning as described herein. In some embodiments, all or a portion of the databases 108a-108b can be integrated with the server computing device 106 or be located on a separate computing device or devices. The databases 108a-108b can be configured to store portions of data used by the other components of the system 100, as will be described in greater detail below. An exemplary database 108a-108b is MySQL™ available from Oracle Corp. of Redwood City, Calif.

The historical user activity database 108a includes historical user activity data, which in some embodiments is a dedicated section of the database 108a that contains specialized data used by the other components of the system 110 to perform the process of automated predictive product recommendations using reinforcement learning as described herein. Generally, the historical user activity data comprises data elements, including structured and/or unstructured computer text, relating to transaction data, demographic data, and recommendation response data. For example, the database 108a can store customer profile information (e.g., age, gender, financial status, income, etc.), account balance and historical transaction information, and the like. In addition, the database 108a can store information relating to a previously received a product recommendation from the agent computing device 103. For example, the customer may not have responded to the recommendation and/or purchased the recommended product. The database 108a tracks this information, for use in generating the recommendation matrix as described herein.

The recommendation database 108b includes the recommendation matrix described herein. As will be described in detail, in some embodiments the recommendation matrix (also called a prediction matrix) comprises a compilation of product recommendations (with incremental operating income value and incremental response likelihood) per customer. The recommendation matrix can be prioritized across customers or across products, to generate a list of product recommendation actions for execution by the agent computing device 103.

Figure 2:
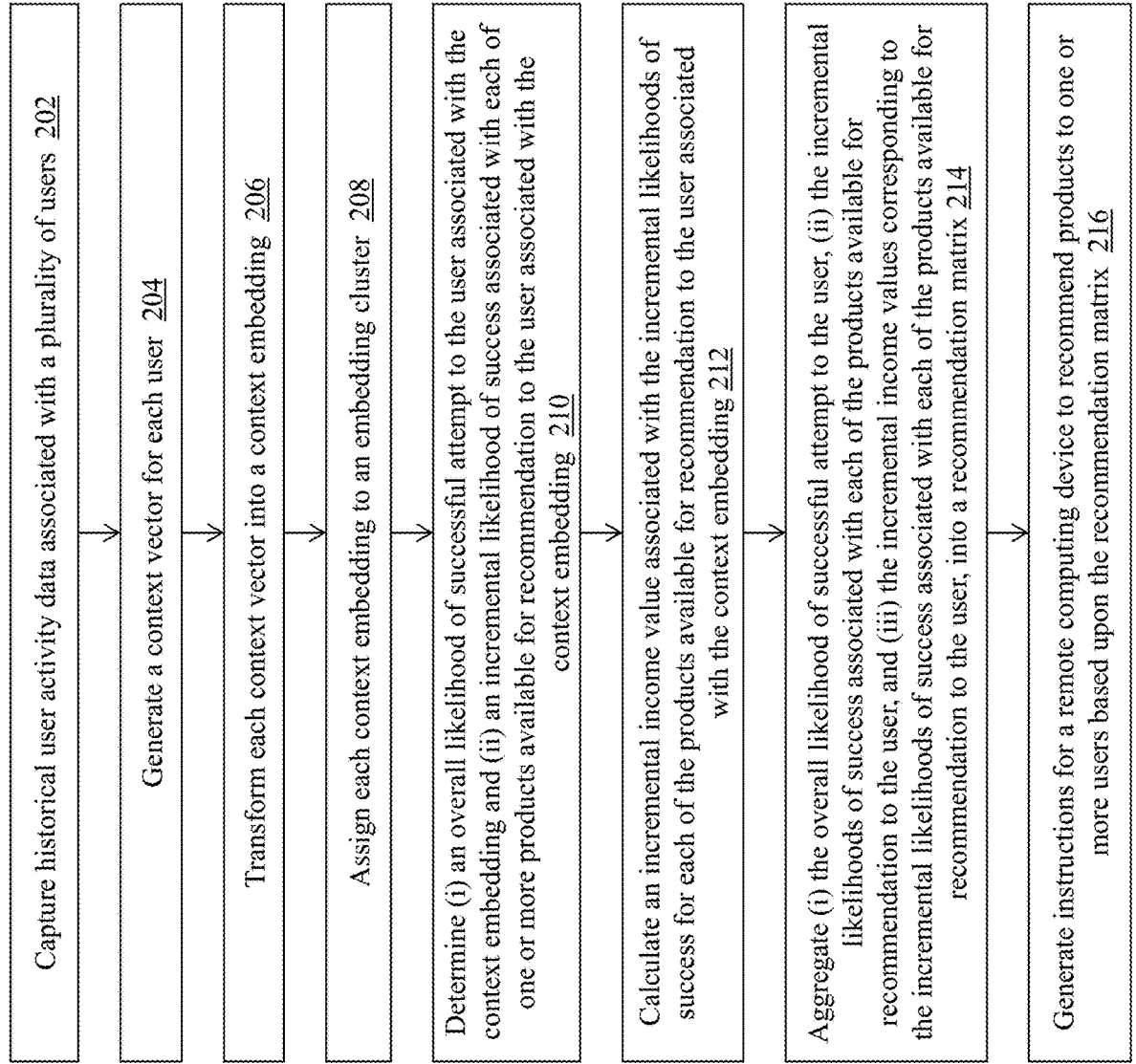
FIG. 2 is a flow diagram of a computerized method of automated predictive product recommendations using reinforcement learning.

FIG. 2 is a flow diagram of a computerized method 200 automated predictive product recommendations using reinforcement learning, using the system 100 of FIG. 1. The vector generation module 106a of server computing device 106 captures (202) historical user activity data associated with a plurality of users (e.g., customers of an organization). As mentioned previously, in some embodiments the historical user activity data comprises transaction data (e.g., financial activity such as money flow, account opening, guidance, interactions through various channels), demographic data (e.g., age, gender, life events), and recommendation response data (e.g., responses to various products that were recommended in the past) corresponding to each of a plurality of users. The historical user activity data can be stored in the historical user activity database 110a and retrieved by the vector generation module 106a.

FIG. 9 is a diagram of exemplary historical user activity data stored in database 110a. As shown in FIG. 9, the data can comprise information associated with the attempt event (e.g., id, event date), a context vector associated with the attempt (as will be explained below), an is attempt flag (denoting whether the attempt was successful in reaching the user) and an is success flag (denoting whether the user purchased a recommended product after the attempt). The historical user activity data can further include a flag for each of several products (e.g., Prod_1, Prod_2, etc.) that denotes whether the particular product was recommended in the attempt, and also an operating income (OI) value that corresponds to the product recommendation attempt.

Turning back to FIG. 2, the vector generation module 106a then generates (204) a context vector for each user based upon the retrieved historical user activity data. The context vector comprises a plurality of features (expressed as numeric values in the context vector) that correspond to attributes and characteristics of the user that are relevant in determining product recommendations for the user (e.g., the attributes and characteristics can be correlated to incremental income). It should be appreciated that the attributes and characteristics can vary depending on a specific business unit and/or use case. In some embodiments, the vector generation module 106a can consider thousands of different user attributes and characteristics in determining a set of features to incorporate into the context vector, with a goal of determining a broad set of features that are applicable to a full user population—rather than a biased sample.

Figure 3:
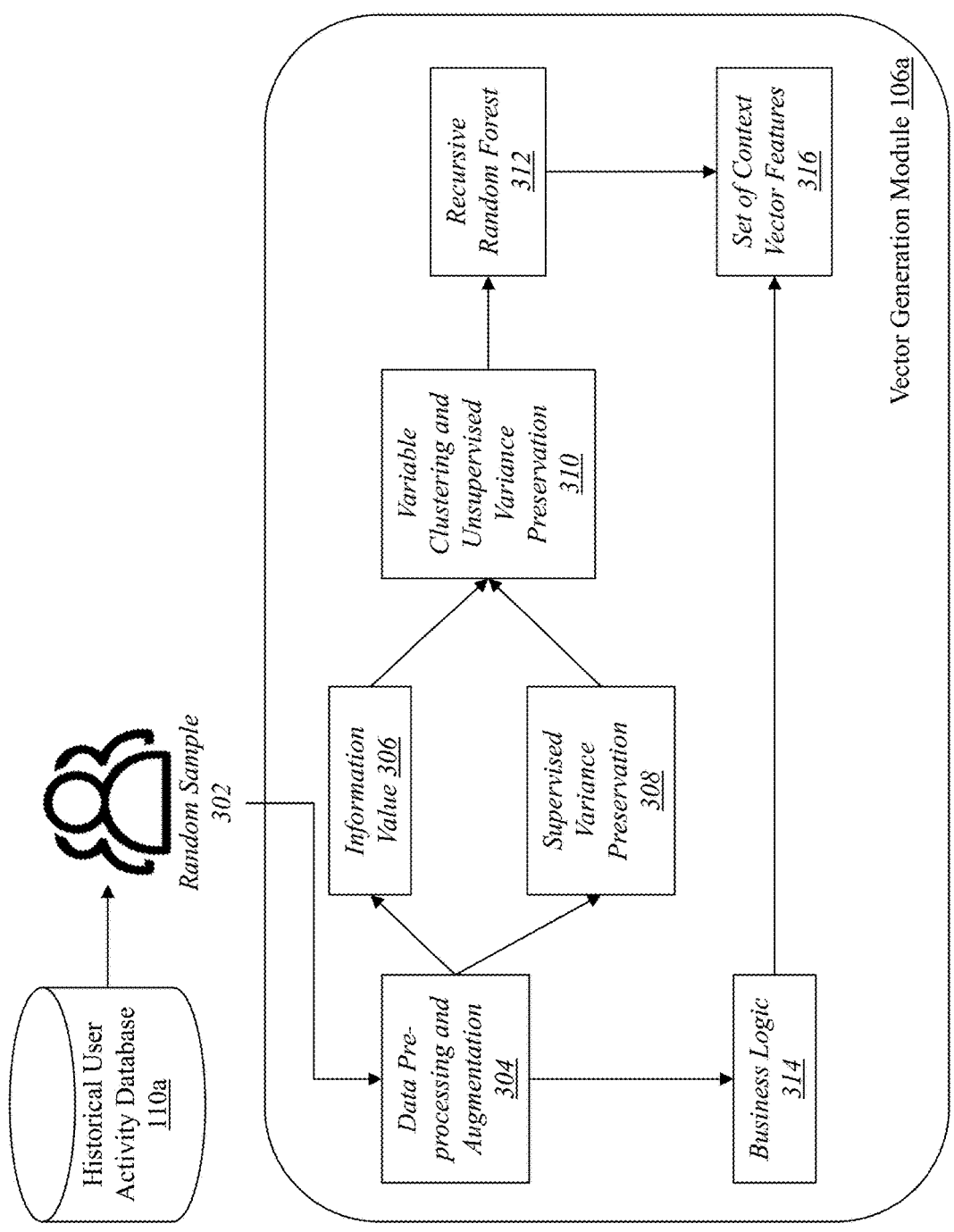
FIG. 3 is a detailed flow diagram of a computerized method of generating a feature set for the context vector.

FIG. 3 is a detailed flow diagram of a computerized method 300 of generating a feature set for the context vector, performed by the system 100 of FIG. 1. In order to determine which features to include into the context vector to achieve the above goal, the vector generation module 106a can select (302) historical user activity data for a random sample of users—in one example, the module 106a can take the historical user activity data for a random 20% of the entire user base as input for the context vector feature set generation. The random sample used by the module 106a can also be distributed across historical outcomes for the users. For example, the module 106a can define that a portion of the sampled historical user activity data corresponds to a recommendation attempt outcome (is_attempt=1)—meaning that a product recommendation was made to the user in the past. The module 106a can further define that another portion of the sampled historical user activity data corresponds to a successful recommendation attempt outcome (is_success=1)—meaning that the user responded to the recommendation attempt (successful attempt) and a product recommendation was made to the user in the past (e.g., purchased a product, customer successfully contacted via the given marketing channel (i.e., picked up a phone call)). And, the module 106a can further define that another portion of the sampled historical user activity data corresponds to a control population that was not attempted for a recommendation—meaning that no attempt was made and hence no product recommendation was made to the user in the past.

Once the vector generation module 106a has determined the sampled historical user activity data to be used in generating the context vector feature set, the result is an initial set of context vector factors (e.g., 20,000 factors). This number of factors is too large for the system 100 to process efficiently, so the module 106a reduces the dimensionality of the initial set of context vector factors into a final set of specific vector features that make up the context vector for each user. First, the module 106a pre-processes and augments (304) the random sample data—such as imputing missing values for certain data elements relating to certain user(s), addressing extremes or outliers, executing a variance threshold on certain data elements relating to certain user(s), and/or capping or flooring certain data elements, then standardizing the variables—to ensure that the data is complete and within reasonable tolerance values. Further information on an exemplary way in which the vector generation module 106a can pre-process the data is described in S. Alexandropoulos et al., "Data preprocessing in predictive data mining," *The Knowledge Engineering Review*, Vol. 34, e1, 1-33, Cambridge Univ. Press (2019), which is incorporated herein by reference.

To isolate the most relevant context features that relate to incremental income while also keeping a check on multicollinearity, the vector generation module 106a performs a series of complex supervised and unsupervised data analysis methods—information value (306), supervised variance preservation (308), variable clustering and unsupervised variance preservation (310), and recursive random forest (312). The information value step (306) is utilized by the module 106a to rank the initial set of context vector factors according to their importance—generally, information value relates to how strong a relationship the factor has to producing incremental income (e.g., a low information value means the factor has a weaker relationship to producing incremental income, while a higher information value means the factor has a stronger relationship to producing incremental income). For example, the information value is calculated for every variable that needs to be tested against a target variable, in order to determine how well a variable is at explaining information that is contained in a target variable. In one embodiment, a standard cutoff of 0.02 is applied as a screener for selecting variables. Additional information describing an exemplary approach on how the information value can be used is provided in B. Lund and D. Brotherton, "Information Value Statistic," Paper AA-14-2013, available at www.mwsug.org/proceedings/2013/AA/MWSUG-2013-AA14.pdf, the entirety of which is incorporated herein by reference.

The vector generation module 106a also performs supervised variance preservation (308) on the initial set of context vector features. As can be appreciated, supervised variance preservation is a greedy forward feature selection technique to check the explanatory power of a variable based upon the variance of the target variable/dataset itself. Further detail on an exemplary supervised variance preservation technique used by the module 106a is described in Z. Zhao et al., "Massively parallel feature selection: an approach based on variance preservation," *Machine Learning* 92, 195-220 (2013), which is incorporated herein by reference.

Taking the results from the information value (306) and supervised variance preservation (308) steps, the vector generation module 106a performs a variable clustering and unsupervised variance preservation (310) step to further reduce the dimensionality of the vector feature set and hone in on specific features that are relevant to incremental incomes. An exemplary unsupervised variance preservation approached is described in detail in Zhao, supra (incorporated by reference). Variable clustering is a technique that divides a feature set into homogeneous clusters of features based on inter- and intra-cluster PCA and correlations. An exemplary variable clustering technique used by the vector generation module 106a is available from https://medium.com/@analyttica/learn-about-variable-clustering-4f765a33d592, which is incorporated herein by reference.

Then, the vector generation module 106a executes a recursive random forest algorithm (312) to further reduce the set of context vector features and generate the final set of context vector features (316). As can be appreciated, recursive random forest is a method for supervised selection where a random forest is applied on the independent variables recursively in order to arrive at the most relevant set of features. An exemplary recursive random forest technique used by the vector generation module 106a is described in Darst, B. F., Malecki, K. C. & Engelman, C. D., "Using recursive feature elimination in random forest to account for correlated variables in high dimensional data," *BMC Genet* 19, 65 (2018); doi.org/10.1186/s12863-018-0633-8, which is incorporated herein by reference.

In some embodiments, the vector generation module 106a also applies business logic programming (314) to the initial set of context vector features to select specific context features that may be relevant to a business unit and add those to the final set of context vector features (316)—in conjunction with the features identified by the recursive random forest algorithm (312). In some scenarios, certain context vector features that were not identified in the above steps, but are important from a business perspective, can be added to the final feature set, e.g., via rules or procedures executed by the module 106a to augment the feature set.

Figure 10:
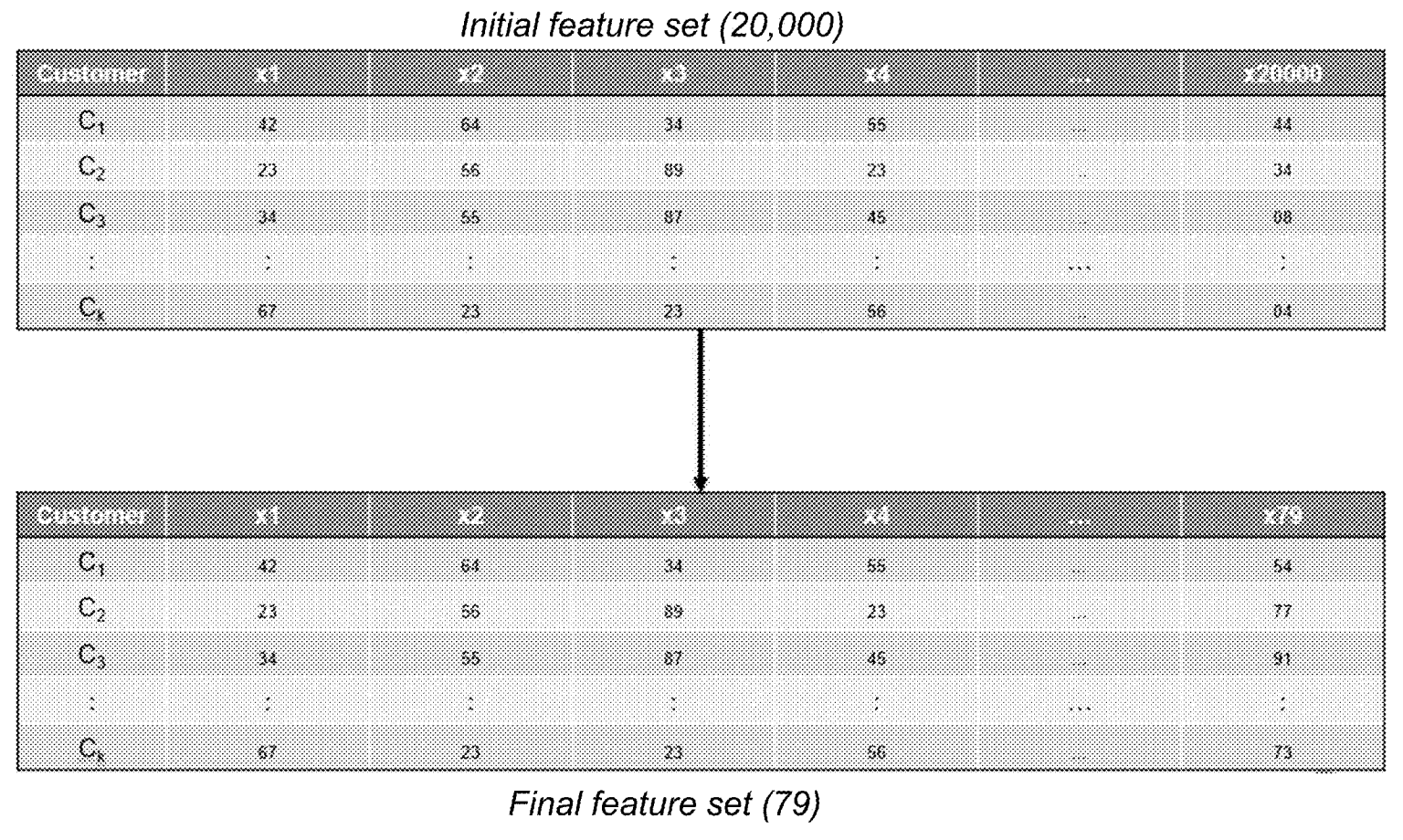

In one embodiment, the vector generation module 106a determined a final set of 79 context vector features to be used in generating the context vector for each user from the original set of 20,000 features, as shown in FIG. 10.

After the vector generation module 106a has generated the multidimensional context vector for each user in the sample based upon the historical user activity data, the clustering module 106b groups the context vectors into clusters based upon, e.g., similarities between the vector attributes for particular customers. Turning back to FIG. 2, the clustering module 106b first transforms (206) each context vector into a context embedding. As mentioned previously, in one example the final set of context vector features comprises 79 features. However, higher-dimensional context vectors such as this can still introduce noise and add to computation time in, e.g., Euclidian distance calculations. Therefore, transforming the context vector into a lower-dimension context embedding can solve both of these problems—by denoising/smoothing the data and reduces the dimensionality to a manageable number. The clustering module 106b uses an autoencoder technique to perform the context embedding generation.

Figure 4:
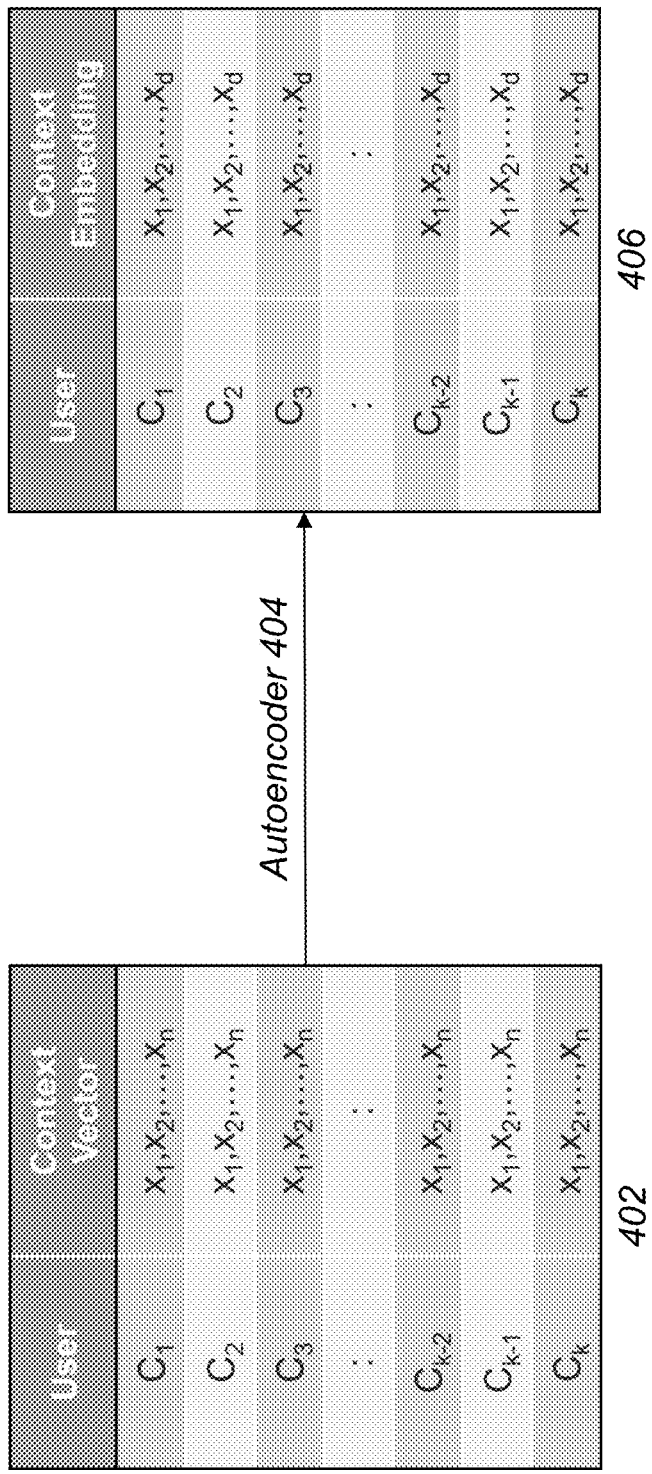
FIG. 4 is a diagram showing a transformation of the context vector to a context embedding.
Figure 11:
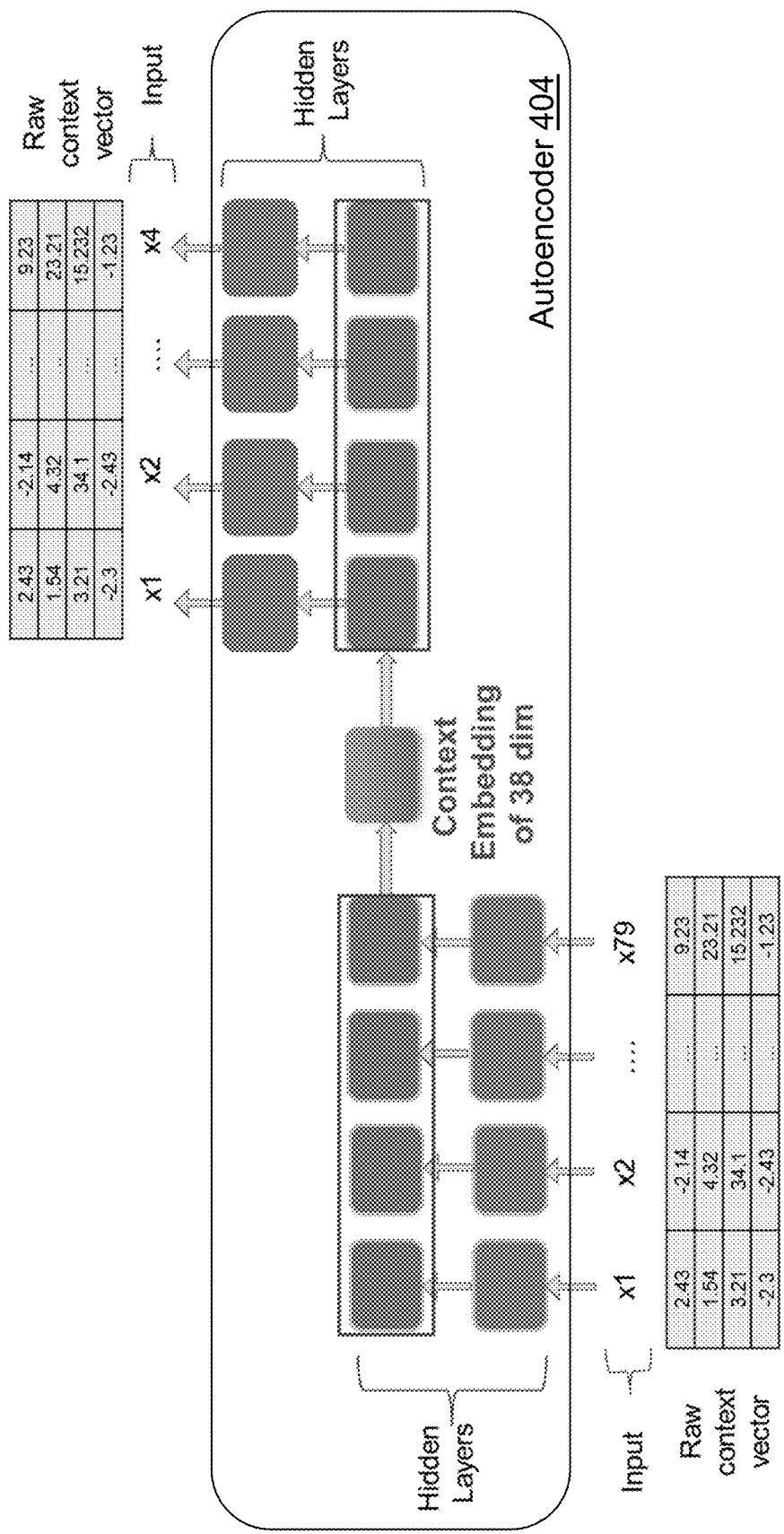
FIG. 11 is a diagram of an exemplary autoencoder used to transform a context vector into a context embedding.

FIG. 4 is a diagram showing the transformation of the context vector to a context embedding by the clustering module 106b. As shown in FIG. 4, the clustering module 106b collects the context vectors 402 for a plurality of users C1-Ck and utilizes an autoencoder 404 on each context vector to transform the context vector into a context embedding 406. FIG. 11 provides an exemplary architecture of the autoencoder 404. To train the autoencoder, the clustering module 106b chooses different layers (dense) and other hyper-parameters like encoding and decoding dimensions. The module 106b finds the best layer values using grid search and at the final stage, the module 106b finds the optimality based on the similarity index between encoded and decoded dimensions. The clustering module 106b uses the autoencoder to determine an optimal number of dimensions d (in one example, d=38) based on the variance explained metric R2 (e.g., R2=80%) between raw features and decoded features.

Figure 5:
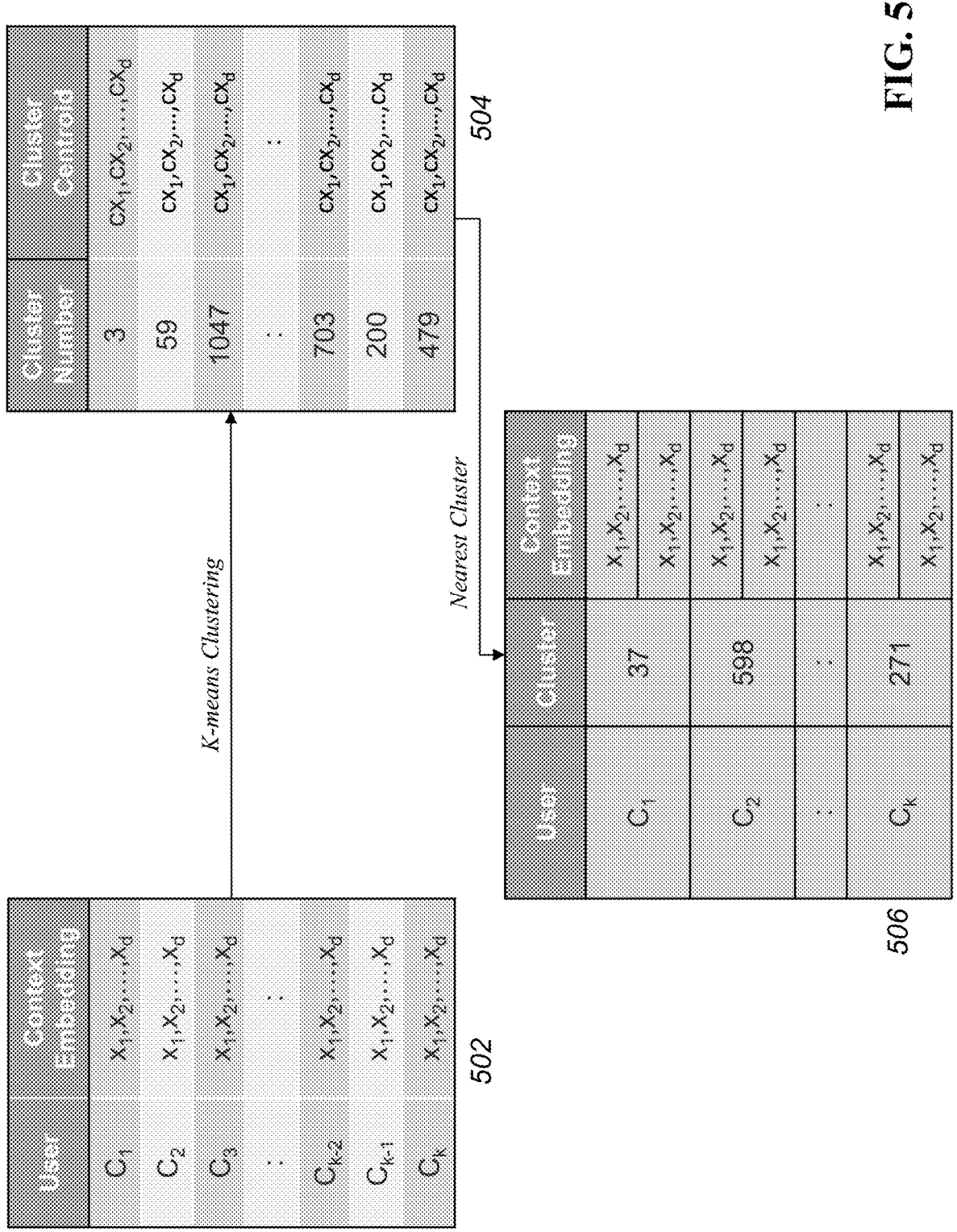
FIG. 5 is a diagram showing clustering of context embeddings into embedding clusters.

Turning back to FIG. 2, after generating the context embeddings, the clustering module 106b assigns (208) each context embedding to an embedding cluster, where each cluster corresponds to a homogeneous group of users as represented in the historical user activity data (e.g., users that have the same or similar features). FIG. 5 is a diagram showing the clustering of context embeddings performed by the clustering module 106b. As shown in FIG. 5, the clustering module 106b executes a k-means clustering algorithm on the context embeddings 502 for each user in the sampled data, to determine a number of embedding clusters 504, each cluster having a corresponding cluster centroid vector (e.g., the vector that represents the average, or center, of the context embedding values). In some embodiments, the clustering module 106b utilizes the MiniBatchKMeans( ) algorithm as implemented in the scikit-learn Python library (available from scikit-learn.org) to generate the embedding clusters 504. This algorithm has a partial_fit( ) method which has the capability to update the clusters whenever new data is received by the clustering module 106b. Furthermore, in some embodiments, the clustering module 106b determines an optimal number of clusters k using the elbow method and distortion metric (as described in en.wikipedia.org/wiki/Determining_the_number_of_clusters_in_a-_data_set, which is incorporated herein by reference). Once the clusters and cluster centroids are determined by the module 106b, the module 106b can then associate each context embedding with a particular cluster, by determining a minimum Euclidian distance between the context embedding and a cluster's centroid vector—resulting in the data structure shown as 506. This technique is applicable to the next phase of the method described herein, specifically the determination of a product recommendation for a particular user based upon that user's specific attributes and characteristics.

Figure 6:
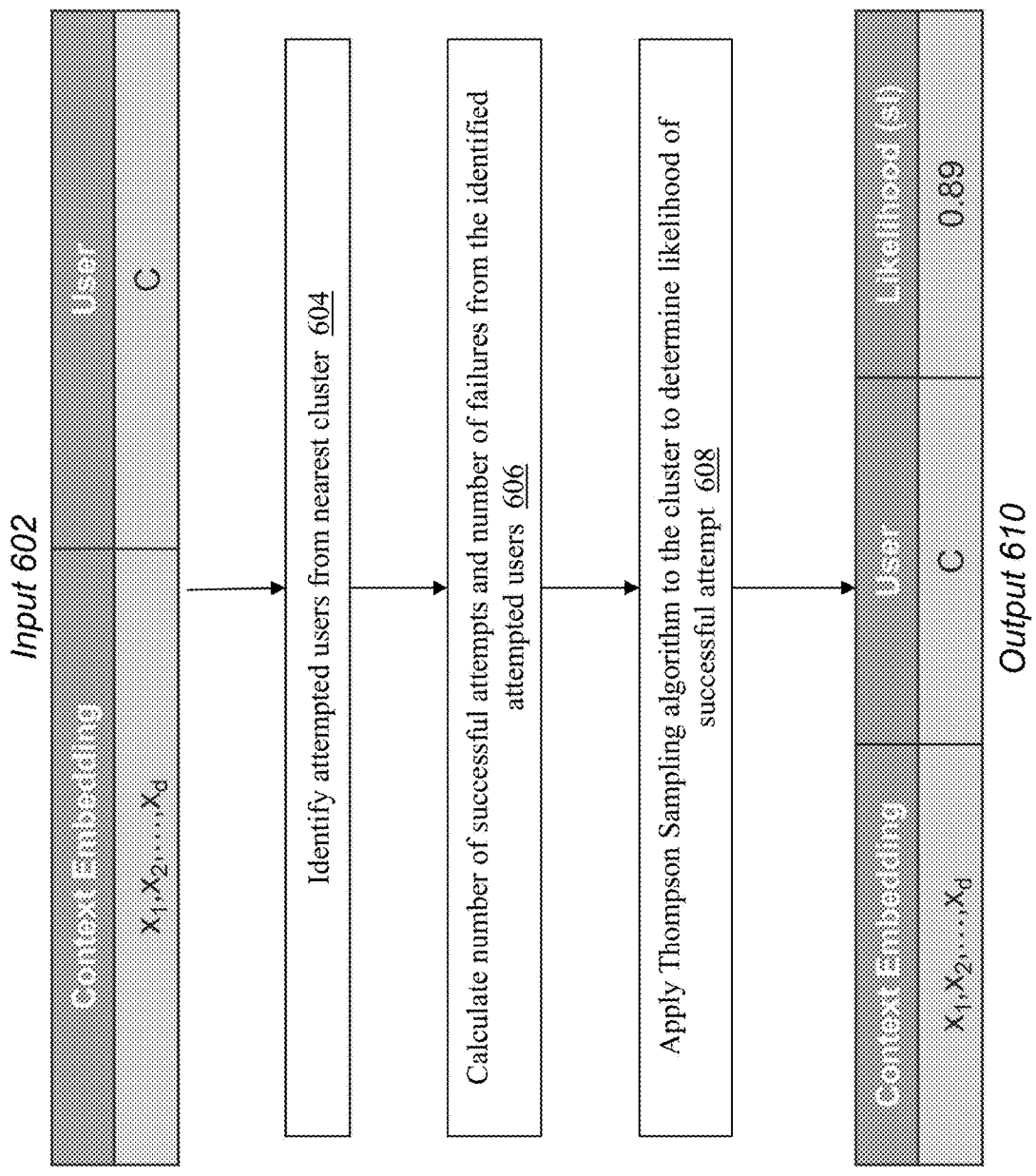
FIG. 6 is a flow diagram of a computerized method of determining an overall likelihood of a successful attempt to the user associated with a context embedding.

Turning back to FIG. 2, once the clustering module 106b has generated the embedding clusters and associated cluster centroid vectors, the matrix generation module 106c can use the embedding clusters to generate a recommendation matrix for users that provides a prediction (or likelihood) as to whether an attempt to recommend a particular product made to a particular user will be successful, as well as a determination of incremental income that can be achieved from the successful attempt. The matrix generation module 106c first generates context embeddings for a set of users (which may be the same or different users as described above) using the steps 202-206 of FIG. 2. For example, the system may want to identify prospective users for new product recommendations that may or may not have previously been recommended one or more products. Once these context embeddings are generated, the module 106c determines (210) (i) an overall likelihood of successful attempt to the user associated with each context embedding and (ii) an incremental likelihood of success associated with each of one or more products available for recommendation to the user associated with each context embedding. FIG. 6 is a flow diagram of a computerized method 600 of determining an overall likelihood of successful attempt to the user associated with a context embedding. As shown in FIG. 6, the matrix generation module 106c uses the context embedding for each user as input 602 to the determination process. The module 106c identifies (604) attempted users from the nearest embedding cluster—e.g., the module 106c uses minimum Euclidian distance between the user's context embedding and the cluster centroids to determine the nearest cluster for the context embedding, then identifies which users in the cluster comprise attempted users (i.e., those users for which a product recommendation attempt was made, or is_attempt=1). The module 106c calculates (604) the number of successful attempts s_(a) (where is_success=1) and the number of failed attempts f_(a) (where is_success=0) from the identified attempted users. Then, the module 106c applies a Thompson Sampling (TS) algorithm to the above data to determine a likelihood of successful recommendation attempt:

$$ts_a = \text{beta}(s_a, f_a, \text{number of samples}) \cdot \text{mean}(\ )$$

The likelihood of successful recommendation attempt is expressed as a numeric value sl (e.g., 0.89 shown in FIG. 6), and the matrix generation module 106c associates this value with the user and corresponding context embedding, shown as output 610 in FIG. 6.

Figure 7:
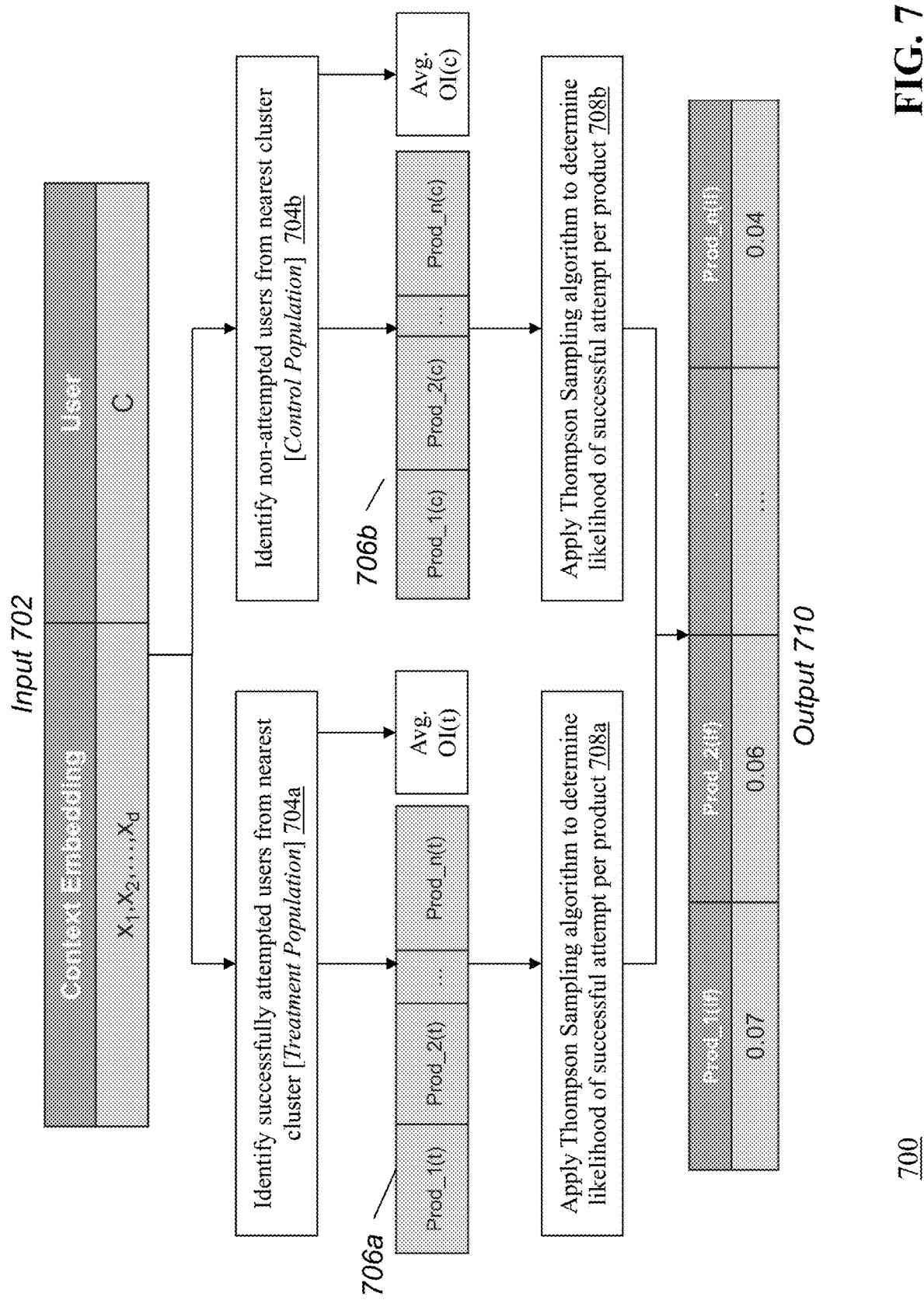
FIG. 7 is a flow diagram of a computerized method of determining the incremental likelihood of successful purchase or conversion across each product available for recommendation given the successful attempt to the user associated with a context embedding.

Turning back to FIG. 2, the matrix generation module 106c proceeds to determine the incremental likelihood (also called lift) of successful attempt across each product available for recommendation to the user associated with the context embedding ((ii) of step 210). Generally, the lift in likelihood of successful product recommendation can be defined as the difference between (a) the likelihood of successful purchase or conversion for a given product among successfully attempted users in an embedding cluster and (b) the likelihood of successful purchase or conversion for a given product among non-attempted users in the embedding cluster. FIG. 7 is a flow diagram of a computerized method 700 of determining the incremental likelihood of successful purchase or conversion across each product available for recommendation to the user associated with a context embedding. As shown in FIG. 7, the matrix generation module 106c uses the context embedding for each user as input 702 to the determination process. The module 106c performs similar steps for each of a treatment population t and control population c as described below.

For the treatment population t, the matrix generation module 106c identifies (704a) successfully attempted users (where is_success=1) from the nearest embedding cluster for the input context embedding (note that, as above, the module 106c determines the nearest cluster by finding a minimum Euclidian distance between the context embedding for the user and the cluster centroid vector). From these successfully attempted users, the module 106c calculates (706a) the success rate (a probability of whether a product is purchased among all the customers who were successfully attempted, i.e., is_success=1) for each of the products (e.g., Prod_1(t), Prod_2(t), . . . , Prod_n(t)). The module 106c also calculates an average operating income (OI) value (an average of the income for all successful customers, regardless of product) for the treatment population, with the understanding that the treatment population is the same as successfully attempted customers. Also, the module 106c can determine an operating income/revenue value based upon, e.g., basis point numbers for each product flow that are multiplied by individual product flows and added up to calculate a final operating income number.

The matrix generation module 106c then applies (708a) a Thompson Sampling algorithm to the calculated values from step 706a in the treatment population to determine the likelihood of successful attempt per product:

$$ts_{(t)(i)} = \text{beta}(s_{(t)(i)}, f_{(t)(i)}, \text{number of samples}) \cdot \text{mean}(\ )$$

where i denotes a particular product, s denotes a successful attempt, and f denotes a failed attempt.

In a similar fashion, the matrix generation module 106c performs the above steps on a control population from the embedding cluster—meaning users that were not attempted a product recommendation. As shown in FIG. 7, for the control population c, the matrix generation module 106c identifies (704b) non-attempted users (where is_attempt=0) from the nearest embedding cluster for the input context embedding (note that, as above, the module 106c determines the nearest cluster by finding a minimum Euclidian distance between the context embedding for the user and the cluster centroid vector). From these non-attempted users, the module 106c calculates (706b) the success rate for each of the products (e.g., Prod_1(c), Prod_2(c), . . . , Prod_n(c))—it should be appreciated that in some instances, a customer may make a self-driven product purchase despite not being attempted. Therefore, success in this context is defined as the probability of a customer purchasing a product without any marketing intervention. The matrix generation module 106c then applies (708b) a Thompson Sampling algorithm to the calculated values from step 706b in the control population to determine the likelihood of successful attempt per product:

$$ts_{(c)(i)} = \text{beta}(s_{(c)(i)}, f_{(c)(i)}, \text{number of samples}) \cdot \text{mean}(\ )$$

where i denotes a particular product, s denotes a successful attempt, and f denotes a failed attempt.

Using the results of the Thompson Sampling algorithms above for each product, the matrix generation module 106c determines as output (710) a lift in likelihood value (lf) for each product i, where if for each product is defined as the difference between (a) the likelihood of successful purchase or conversion for a given product from the treatment population t and (b) the likelihood of successful purchase or conversion for the same product from the control population c. For example, for a given product Prod_1, the lift in likelihood is: $\text{Prod}_1(\text{lf}) = \text{Prod}_1(t) - \text{Prod}_1(c)$. The matrix generation module 106c collects the lift in likelihood value for each product for that particular user, as shown in output 710. In some embodiments, the matrix generation module 106c can prioritize the lift in likelihood values across the products for the user by, e.g., sorting the products from left to right according to lift in likelihood value. The matrix generation module 106c repeats the above steps for each context embedding corresponding to each user in the set of users until the lift in likelihood values per product are determined for each user.

Figure 8:
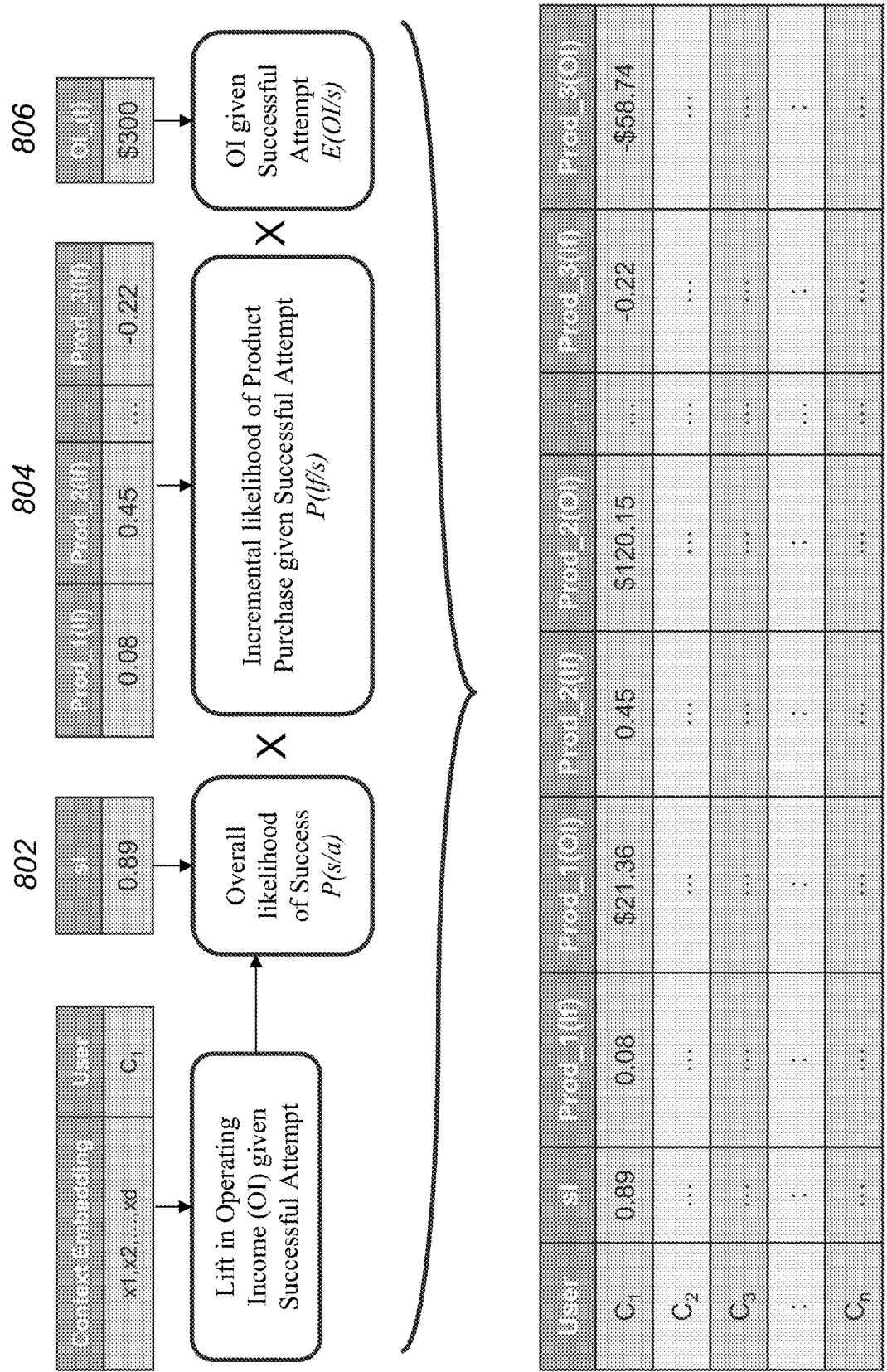
FIG. 8 is a diagram showing how incremental income value is calculated.

Turning back to FIG. 2, the matrix generation module 106c then calculates (212) an incremental income value associated with the incremental likelihoods of success for each of the products available for recommendation to the user associated with the context embedding. FIG. 8 is a diagram showing how the incremental income value is calculated by the matrix generation module 106c. As shown in FIG. 8, for a given user/context embedding, the module 106c multiplies the overall likelihood of successful attempt 802 (determined in step 210 of FIG. 2), the incremental likelihood of success for each product 804, and the average operating income (OI) value for the treatment population 806 (determined in step 706a of FIG. 7) to arrive at an incremental income value for each product and for each customer, as shown in output 808. An example calculation for a particular user C1 as shown in FIG. 8 is:

Incremental income=Overall likelihood of successful attempt×$\text{Prod}_1(lf)$×Avg.OI(t)Incremental income=0.89×0.08×$300=$21.36

This means that for a particular user C1, the predicted increase in income for a given product Prod_1 that results from a product recommendation attempt to the user is $21.36, over the income that results from not recommending the product. Also, as shown in FIG. 8 for the same user C1, another product Prod_2 may be associated with a higher incremental income value (e.g., $120.15) and still another product Prod_3 may be associated with a lower (in some cases, even negative) incremental income value (e.g., −$58.74). The matrix generation module 106c can thereby determine that a particular product Prod_2 is associated with a highest incremental income value.

Referring back to FIG. 2, the matrix generation module 106c aggregates (214) (i) the overall likelihood of successful attempt to the user, (ii) the incremental likelihoods of success associated with each of the products available for recommendation to the user, and (iii) the incremental income values corresponding to the incremental likelihoods of success associated with each of the products available for recommendation to the user, into a recommendation matrix (shown as output 808 in FIG. 8). The recommendation matrix can be stored by the server computing device 106 in recommendation database 110b for use by the agent computing device 103 in generating product recommendation attempts to users (e.g., at client computing device 102) as described below.

Using the recommendation matrix, the server computing device 106 generates (216) programmatic instructions for a remote computing device (i.e., agent device 103) to recommend products to one or more users at client devices. In one example, the server computing device 106 can prioritize the recommendation matrix according to the incremental income values for particular products—such as sorting the recommendation matrix from highest to lowest incremental income value for a particular product, thereby producing a prioritized list of users that should be recommended specific products based upon a maximization of potential incremental income to be realized. It should be appreciated that the server computing device 106 can prioritize the recommendation matrix in different ways (e.g., based upon varying business objectives) without departing from the scope of invention.

Upon prioritizing the recommendation matrix, the server computing device 106 can identify the users that correspond to the top n incremental income values for a given product using the matrix and retrieve the users' contact information to provide to the agent computing device 103 (along with, or in lieu of, providing the matrix to the agent device 103). For example, in a call center environment, the server computing device 106 can provide the user phone numbers, other user information (e.g., name, address, demographics, financial history, etc.) and specific product information to the agent computing device 103. A software module on the agent computing device 103 (e.g., a CRM application that includes an autodialer) can populate a user interface on the agent device that shows the list of customers to be contacted (based on the recommendation matrix), the product to be recommended, and simultaneously initiate a telephone call to the client device 102 so that an agent at the agent device 103 can attempt to recommend the product to the user. As mentioned previously, the channel used to provide product recommendations may be relevant to incremental income—so the server computing device 106 and the agent device 103 can be configured to provide product recommendations based upon the matrix according to particular channels (e.g., email, text, voice call, etc.). The software module on the agent device 103 can accordingly be configured to contact the client device 102 via any one or more of these communication channels—e.g., by automatically composing an email for agent review and transmission (or in some cases, automatically sending the email), and so forth.

Data relating to above product recommendation attempts (and resulting successful attempts and product purchases, if any) can be monitored and provided back to the server computing device 106 in the historical user activity database 110a for subsequent ingestion by the server computing device 106 to update the recommendation matrix as described herein. Importantly, this type of feedback loop based upon user activity monitoring provides a beneficial way to continually refine the recommendation matrix based upon the latest activity data, so that the matrix always reflects the optimal incremental income values for particular products and users—without necessitating manual re-tuning of an AI-based model.

can provide the recommendation matrix to the agent computing device 103

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automated predictive product recommendations using reinforcement learning, the method comprising:
    capturing, by a server computing device, historical user activity data associated with a plurality of users, the historical user activity data comprising transaction data, demographic data, and recommendation response data;
    generating, by the server computing device, a context vector for each user of the plurality of users, the first context vector comprising a multidimensional array corresponding to at least a portion of the historical user activity data for the user;
    transforming, by the server computing device, each context vector for the plurality of users into a context embedding, the context embedding comprising a multidimensional array that has a fewer number of dimensions than the context vector;
    assigning, by the server computing device, each context embedding for the plurality of users to an embedding cluster;
    determining, by the server computing device for each context embedding, (i) an overall likelihood of successful attempt to the user associated with the context embedding and (ii) an incremental likelihood of success associated with each of one or more products available for recommendation to the user associated with the context embedding;
    calculating, by the server computing device for each context embedding, an incremental income value associated with each of the incremental likelihoods of success associated with the products available for recommendation to the user associated with the context embedding;
    aggregating, by the server computing device, (i) the overall likelihood of successful attempt to the user associated with the context embedding, (ii) the incremental likelihoods of success associated with each of the products available for recommendation to the user associated with the context embedding, and (iii) the incremental income values corresponding to the incremental likelihoods of success associated with each of the products available for recommendation to the user associated with the context embedding, into a recommendation matrix for the plurality of users; and
    generating, by the server computing device, instructions for a remote computing device to recommend products to one or more users based upon the recommendation matrix.

2. The method of claim 1, wherein determining the incremental likelihood of success associated with each of one or more products available for recommendation to the user associated with the context embedding comprises:
    identifying, by the server computing device, one or more other context embeddings in the embedding cluster assigned to the user's context embedding that have a successful product recommendation;

determining, by the server computing device, a first likelihood of success associated with each of the products available for recommendation based upon the identified context embeddings that have a successful product recommendation;

identifying, by the server computing device, one or more other context embeddings in the embedding cluster assigned to the user's context embedding that have not been recommended a product;

determining, by the server computing device, a second likelihood of success associated with each of the products available for recommendation based upon the identified context embeddings that have not been recommended a product;

generating, by the server computing device, an incremental likelihood of success associated with each of the one or more products available for recommendation to the user associated with the context embedding by comparing, for each product, (i) the first likelihood of success to (ii) the second likelihood of success.

3. The method of claim 2, wherein determining a first likelihood of success associated with each of the products available for recommendation based upon the identified context embeddings that have a successful product recommendation comprises:

generating, by the server computing device, a success rate for each of the products based upon the identified context embeddings that have a successful product recommendation; and applying, by the server computing device, a Thompson Sampling algorithm to the success rate for each of the products to generate the first likelihood of success associated with each of the products available for recommendation based upon the identified context embeddings that have a successful product recommendation.

4. The method of claim 2, wherein determining a second likelihood of success associated with each of the products available for recommendation based upon the identified context embeddings that have not been recommended a product comprises:

generating, by the server computing device, a success rate for each of the products based upon the identified context embeddings that have not been recommended a product; and applying, by the server computing device, a Thompson Sampling algorithm to the success rate for each of the products to generate the second likelihood of success associated with each of the products available for recommendation based upon the identified context embeddings that have not been recommended a product.

5. The method of claim 1, wherein transforming each context vector for the plurality of users into a context embedding comprises:

executing, by the server computing device, an auto-encoder against the context vector to determine an optimal number of dimensions for the context embedding; and transforming, by the server computing device, the context vector into the context embedding using an output of the auto-encoder.

6. The method of claim 1, wherein assigning each context embedding for the plurality of users to an embedding cluster comprises:

generating, by the server computing device, a plurality of embedding clusters by applying an observation clustering algorithm to the context embeddings for the plurality of users, each embedding cluster comprising a centroid vector generated by the observation clustering algorithm; and assigning, by the server computing device, each context embedding to an embedding cluster whose centroid vector has a minimum distance to the context embedding.

7. The method of claim 6, wherein the minimum distance is a Euclidian minimum distance.

8. The method of claim 6, wherein the observation clustering algorithm is a K-means clustering algorithm.

9. The method of claim 1, wherein determining the overall likelihood of successful attempt to the user associated with the context embedding comprises:

identifying, by the computing device, one or more other context embeddings in the embedding cluster assigned to the user's context embedding that have been recommended a product;

generating, by the server computing device, a success rate and a failure rate associated with the identified context embeddings; and applying, by the server computing device, a Thompson Sampling algorithm to the success rate and the failure rate to generate the overall likelihood of successful attempt to the user associated with the context embedding.

10. The method of claim 1, wherein the server computing device sorts the recommendation matrix across the plurality of users by one or more of the incremental income values associated with one or more of the products available for recommendation or the overall likelihood of successful attempt.

11. The method of claim 1, wherein generating instructions for a remote computing device to recommend products to one or more users based upon the recommendation matrix comprises:

generating, by the server computing device, a ranking of one or more users based upon the recommendation matrix;

determining, by the server computing device, a contact channel for each user in the ranking of users; and transmitting, by the server computing device, the ranking of users, the recommendation matrix, and the contact channel for each user to a remote computing device, wherein the remote computing device provides a product recommendation to a computing device of each user via the contact channel, the product recommendation based upon the recommendation matrix.

12. The method of claim 11, wherein the contact channel comprises an email address, an IP address, a phone number, a messaging address, or a social media identifier.

13. The method of claim 11, wherein the remote computing device determines a product recommendation to provide to the user by selecting an optimal incremental income value for the user from the recommendation matrix and identifying a product based upon the optimal incremental income value.

14. A system for automated predictive product recommendations using reinforcement learning, the system comprising a server computing device having a memory for storing computer-executable instructions and a processor that executes the computer-executable instructions to:

capture historical user activity data associated with a plurality of users, the historical user activity data comprising transaction data, demographic data, and recommendation response data;

generate a context vector for each user of the plurality of users, the first context vector comprising a multidimensional array corresponding to at least a portion of the historical user activity data for the user;

transform each context vector for the plurality of users into a context embedding, the context embedding comprising a multidimensional array that has a fewer number of dimensions than the context vector;

assign each context embedding for the plurality of users to an embedding cluster;

determine, for each context embedding, (i) an overall likelihood of successful attempt to the user associated with the context embedding and (ii) an incremental likelihood of success associated with each of one or more products available for recommendation to the user associated with the context embedding;

calculate, for each context embedding, an incremental income value associated with each of the incremental likelihoods of success associated with the products available for recommendation to the user associated with the context embedding;

aggregate (i) the overall likelihood of successful attempt to the user associated with the context embedding, (ii) the incremental likelihoods of success associated with each of the products available for recommendation to the user associated with the context embedding, and (iii) the incremental income values corresponding to the incremental likelihoods of success associated with each of the products available for recommendation to the user associated with the context embedding, into a recommendation matrix for the plurality of users; and generate instructions for a remote computing device to recommend products to one or more users based upon the recommendation matrix.

15. The system of claim 14, wherein determining the incremental likelihood of success associated with each of one or more products available for recommendation to the user associated with the context embedding comprises:

identifying one or more other context embeddings in the embedding cluster assigned to the user's context embedding that have a successful product recommendation;

determining a first likelihood of success associated with each of the products available for recommendation based upon the identified context embeddings that have a successful product recommendation;

identifying one or more other context embeddings in the embedding cluster assigned to the user's context embedding that have not been recommended a product;

determining a second likelihood of success associated with each of the products available for recommendation based upon the identified context embeddings that have not been recommended a product;

generating an incremental likelihood of success associated with each of the one or more products available for recommendation to the user associated with the context embedding by comparing, for each product, (i) the first likelihood of success to (ii) the second likelihood of success.

16. The system of claim 15, wherein determining a first likelihood of success associated with each of the products available for recommendation based upon the identified context embeddings that have a successful product recommendation comprises:

generating a success rate for each of the products based upon the identified context embeddings that have a successful product recommendation; and applying a Thompson Sampling algorithm to the success rate for each of the products to generate the first likelihood of success associated with each of the products available for recommendation based upon the identified context embeddings that have a successful product recommendation.

17. The system of claim 15, wherein determining a second likelihood of success associated with each of the products available for recommendation based upon the identified context embeddings that have not been recommended a product comprises:

generating a success rate for each of the products based upon the identified context embeddings that have not been recommended a product; and applying a Thompson Sampling algorithm to the success rate for each of the products to generate the second likelihood of success associated with each of the products available for recommendation based upon the identified context embeddings that have not been recommended a product.

18. The system of claim 14, wherein transforming each context vector for the plurality of users into a context embedding comprises:

executing an auto-encoder against the context vector to determine an optimal number of dimensions for the context embedding; and transforming the context vector into the context embedding using an output of the auto-encoder.

19. The system of claim 14, wherein assigning each context embedding for the plurality of users to an embedding cluster comprises:

generating a plurality of embedding clusters by applying an observation clustering algorithm to the context embeddings for the plurality of users, each embedding cluster comprising a centroid vector generated by the observation clustering algorithm; and assigning each context embedding to an embedding cluster whose centroid vector has a minimum distance to the context embedding.

20. The system of claim 19, wherein the minimum distance is a Euclidian minimum distance.

21. The system of claim 19, wherein the observation clustering algorithm is a K-means clustering algorithm.

22. The system of claim 14, wherein determining the overall likelihood of successful attempt to the user associated with the context embedding comprises:

identifying one or more other context embeddings in the embedding cluster assigned to the user's context embedding that have been recommended a product;

generating a success rate and a failure rate associated with the identified context embeddings; and applying a Thompson Sampling algorithm to the success rate and the failure rate to generate the overall likelihood of successful attempt to the user associated with the context embedding.

23. The system of claim 14, wherein the server computing device sorts the recommendation matrix across the plurality of users by one or more of the incremental income values associated with one or more of the products available for recommendation or the overall likelihood of successful attempt.

24. The system of claim 14, wherein generating instructions for a remote computing device to recommend products to one or more users based upon the recommendation matrix comprises:

generating a ranking of one or more users based upon the recommendation matrix;

determining a contact channel for each user in the ranking of users; and transmitting the ranking of users, the recommendation matrix, and the contact channel for each user to a remote computing device, wherein the remote computing device provides a product recommendation to a computing device of each user via the contact channel, the product recommendation based upon the recommendation matrix.

25. The system of claim 24, wherein the contact channel comprises an email address, an IP address, a phone number, a messaging address, or a social media identifier.

26. The system of claim 24, wherein the remote computing device determines a product recommendation to provide to the user by selecting an optimal incremental income value for the user from the recommendation matrix and identifying a product based upon the optimal incremental income value.

\* \* \* \* \*